(12) United States Patent
Schiraldi et al.

(10) Patent No.: US 6,544,611 B2
(45) Date of Patent: Apr. 8, 2003

(54) OXYGEN SCAVENGING PET BASED POLYMER

(75) Inventors: David Anthony Schiraldi, Charlotte, NC (US); Douglas John Sekelik, Greer, SC (US); Brad Lee Smith, Wilmington, NC (US)

(73) Assignee: Arteva North America S.A.R.L., Zurich (CH)

( * ) Notice: Subject to any disclaimer, the term of this patent is extended or adjusted under 35 U.S.C. 154(b) by 0 days.

(21) Appl. No.: 09/920,558

(22) Filed: Aug. 1, 2001

(65) Prior Publication Data

US 2003/0031815 A1 Feb. 13, 2003

(51) Int. Cl.[7] ...................... C08G 63/183; C08G 63/83; C08G 63/91
(52) U.S. Cl. .................... 428/35.8; 428/35.2; 428/35.9; 428/36.92; 525/177; 525/445; 525/933; 528/280; 528/281; 528/304; 528/306; 528/307
(58) Field of Search ................................. 525/177, 445, 525/933; 528/280, 281, 304, 306, 307; 428/35.2, 35.8, 38.9, 36.92

(56) References Cited

U.S. PATENT DOCUMENTS

| RE32,765 E | 10/1988 | Callander | 524/382 |
|---|---|---|---|
| 5,008,230 A | 4/1991 | Nichols | 502/170 |

FOREIGN PATENT DOCUMENTS

| WO | WO 98/12244 | 3/1998 |
|---|---|---|
| WO | WO 99/48963 | 9/1999 |

*Primary Examiner*—Patricia A. Short
(74) *Attorney, Agent, or Firm*—Gregory N. Clements

(57) ABSTRACT

The present invention improves the effectiveness of the oxygen scavenging composition and maintains an excellent balance in the color properties of the polymer. The present invention relates to an improved oxygen scavenging PET based copolymer comprising from about 10 to about 120 ppm cobalt based on the PET polymer, and from about 15 to about 150 ppm zinc based on the PET polymer. The present invention also comprises a process for preparing a PET based oxygen scavenging copolymer, comprising the steps of:

a) polymerizing a PET based polymer;
b) adding Zn, Co, and an oxygen scavenging compound during said polymerizing step;
c) copolymerizing said oxygen scavenging compound with said PET based polymer to form a copolymer; and
d) extruding said copolymer.

The present invention also comprises an oxygen barrier container having one or more layers of a PET based oxygen scavenging copolymer having from about 10 to about 120 ppm Co based on said PET polymer, and from about 15 to about 150 ppm Zn based on the PET polymer; and an oxygen scavenging compound wherein said Co and said Zn are catalysts for said oxygen scavenging compound.

35 Claims, 1 Drawing Sheet

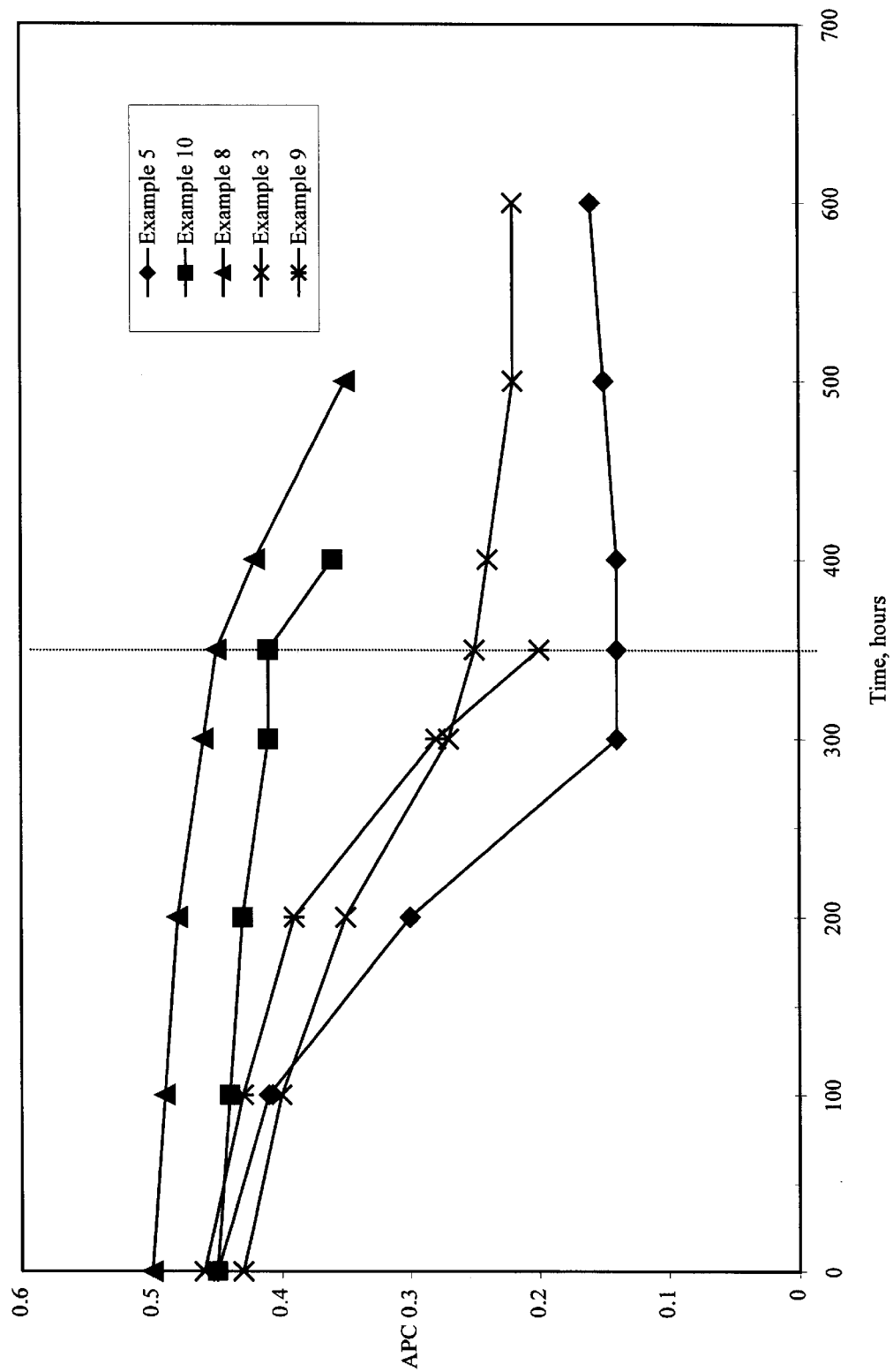
The Figure

OXYGEN SCAVENGING PET BASED POLYMER

BACKGROUND OF THE INVENTION

1) Field of the Invention

The present invention relates to a packaging resin useful in the food industry based on polyethylene terephthalate (PET) polymer. In particular, the present invention is a copolymer based on an oxygen scavenging compound and a PET based polymer containing from about 10 to about 120 parts per million (ppm) cobalt (Co) based on the PET polymer, and from about 15 to 150 ppm zinc (Zn) based on the PET polymer. Both Co and Zn are catalyst for the oxygen scavenging compound, and additionally may serve as catalyst for the ester interchange reaction, if the PET based polymer is produced using such a reaction process. This copolymer may be used to produce packaging films, beverage containers such as soft drinks or beer bottles, or food containers such as ketchup bottles, baby food containers, etc.

2) Prior Art

Oxygen scavenging polymers are well known and are especially useful in the food packaging business. It is known that oxygen can have an effect on the odor and taste of packaged food thereby shortening the shelf life of the food. Oxygen scavenging packaging materials, on the other hand, react with oxygen that is in the process of traversing the packaging barrier. Thus the oxygen scavenging packaging material reduces or eliminates the odor and/or undesirable taste of food or beverages excessively exposed to oxygen.

It is known to use ethylene acrylate copolymers, which are modified with selected cyclic and allylic pendent groups, in oxygen scavenging packaging materials. It is also known to use polyethylene terephthalate or polyethylene naphthalate in conjunction with an oxygen scavenging polymer. The most frequently disclosed oxygen scavenging material is polybutadiene and copolymers thereof having cyclic and allylic pendant groups. However, oxygen scavenging materials, such as polybutadiene for example, need a catalyst to effectively react with oxygen. Well known in the art as catalysts for oxygen scavenging materials are the transition metal catalysts. Compounds, such as salts of transition metal elements are typical catalysts.

PCT Patent Application WO 98/12244 in the name of inventors Cahill et al. for Amoco Corporation discloses an oxygen scavenging composition wherein the critical oxygen scavenging material is polybutadiene and the catalyst for the oxygen scavenging material is transition metal salts or other compounds. This application discloses the usefulness of such a composition as a blend with polymers for packaging films and containers for the food and beverage industry.

PCT Patent Application WO 99/48963 in the name of Ching et al. for Chevron Chemical Company discloses an oxygen scavenging composition including a polymer or oligomer having at least one cyclohexene group or functionality. This application also discloses the use of transition elements as a catalyst to activate the oxygen scavenging composition. The transition metal catalysts are employed in the form of salts and other compositions. This reference also notes that cobalt, a transition metal catalyst, is preferred.

It is known to use a cobalt compound as an esterification catalyst for producing PET when the starting raw materials are esters of dicarboxylic acids and glycols, for example. Cobalt is also typically used to balance the color properties of PET so that it has a more neutral clear color. Patents teaching cobalt compounds' use as an ester interchange catalyst or as an additive to balance the color are numerous.

U.S. Patent Re. 32,765 to Callander et al teaches high clarity colorless polyesters. To achieve this, a cobalt compound is used which neutralizes the yellow color. This patent also cautions against the over use of cobalt because it increases the acetaldehyde level in a container. Acetaldehyde destroys the taste of cola soft drinks, for example.

U.S. Pat. No. 5,008,230 to Nichols teaches a catalyst system for producing PET using both zinc and cobalt compounds. In this system, the catalysts are used to balance the color properties and reduce the polymerization time of PET made from terephthalic acid and ethylene glycol.

Oxygen scavenging compositions using transition metal catalysts, and particularly cobalt compounds, are effective in packaging polymer applications, nevertheless, their performance needs improvement. Improvement in the performance permits longer shelf life for the food. Additionally, when too much cobalt catalyst is employed in oxygen scavenging compositions, the color of the polymer over corrects, becoming too blue, and is unacceptable. Therefore, there is a need to balance the color of the polymer with an improved oxygen scavenging ability.

SUMMARY OF THE INVENTION

The present invention improves the effectiveness of the oxygen scavenging composition and maintains an excellent balance in the color properties of the PET based polymer. It is known that too much cobalt provides too much blue coloring, and can sometimes also produce haziness. On the other hand, some cobalt is generally desirable when forming PET based polymer to balance the yellow coloring, which generally appears during the production thereof.

The present invention has a synergistic effect in the use of zinc as a catalyst for the oxygen scavenging material compared with other transition metal catalysts. This has not been recognized prior to the present invention.

In the broadest sense, the present invention relates to an improved oxygen scavenging PET based copolymer comprising from about 10 to about 120 ppm cobalt based on the PET polymer, and from about 15 to about 150 ppm zinc based on the PET polymer.

In the broadest sense, the present invention also comprises: producing a polyester using Zn and Co as catalysts or coloring agents, copolymerizing an oxygen scavenging compound with the polyester, and extruding the resultant copolymer.

In the broadest sense, the present invention also comprises a process for preparing a PET based oxygen scavenging copolymer, comprising the steps of:

a) polymerizing a PET based polymer;

b) adding Zn, Co, and an oxygen scavenging compound during said polymerizing step;

c) copolymerizing said oxygen scavenging compound with said PET based polymer to form a copolymer; and d) extruding said copolymer.

In the broadest sense, the present invention also comprises a process for preparing a PET based oxygen scavenging copolymer, comprising the steps of:

a) providing an extruder with a heated mixing zone;

b) feeding a PET based polymer, containing one or both Co and Zn catalyst, to said extruder;

c) feeding to said extruder, materials selected from the class consisting of:

i) an oxygen scavenging compound and Zn, if Zn is not in said PET;

ii) an oxygen scavenging compound and Co, if Co is not in said PET; and iii) an oxygen scavenging compound if said PET contains both Co and Zn;

d) copolymerizing in said extruder said oxygen scavenging compound with said PET based polymer to form a copolymer; and e) extruding said copolymer.

In the broadest sense, the present invention also comprises an oxygen barrier container having one or more layers of a PET based copolymer having from about 10 to about 120 ppm Co based on said PET polymer, and from about 15 to about 150 ppm Zn based on the PET polymer; and an oxygen scavenging compound wherein said Co and said Zn are catalysts for said oxygen scavenging compound.

DESCRIPTION OF THE DRAWING

The foregoing and other objects will become more readily apparent by referring to the following detailed description and the appended drawing in which the drawing graphically illustrates the results of the APC of oxygen (expressed in cubic centimeters, centimeters, per square meter, atmosphere, day—(cc.cm)/(m$^2$.atm.day)) across a film barrier of certain Examples, versus time in hours.

DESCRIPTION OF THE PREFERRED EMBODIMENTS

Oxygen scavenging polymers of the present invention can be incorporated into packaging materials such as films for shrink wrap, or heat sealable film for containing food. The oxygen scavenger polymers can also be part of a layered film such as a polyethylene/PET/oxygen scavenger polymer/PET for food packaging. Additionally, the oxygen scavenger polymers of the present invention can be employed for containers such as water, soft drinks, or beer wherein the container is a PET based oxygen scavenger polymer, or the container may be layered such as a PET/oxygen scavenger polymer/PET container. Additionally, this same container concept can be applied for hot filled foods such as for baby foods or ketchup bottles, or for a container for sugar, salt or other staple items. Generally, the uses of the present invention in food packaging are where it is necessary to prevent oxygen incursion into the food.

Suitable polyesters are produced from the reaction of a diacid or diester component comprising at least 60 mole percent TA or $C_1$-$C_4$ dialkyl terephthalate, preferably at least 75 mole percent, and more preferably at least 85 mole percent; and a diol component comprising at least 60 mole percent EG, preferably at least 75 mole percent, and more preferably at least 85 mole percent. It is also preferred that the diacid component be TA, or the dialkyl terephthalate component be DMT, and the diol component is EG. The mole percentage for all the diacids/dialkyl terephthalate components total 100 mole percent, and the mole percentage of all diol components total 100 mole percent.

Where the polyester components are modified by one or more diol components other than EG, suitable diol components of the described polyester can be selected from 1,4-cyclohexanedimethanol; 1,2-propanediol; 1,3-propanediol; 1,4-butanediol; 2,2-dimethyl-1,3-propanediol; 1,6-hexanediol; 1,2-cyclohexanediol; 1,4-cyclohexanediol; 1,2-cyclohexanedimethanol; 1,3-cyclohexanedimethanol; and diols containing one or more oxygen atoms in the chain, for example diethylene glycol, triethylene glycol, dipropylene glycol, tripropylene glycol or mixtures of these and the like. In general, these diols contain 2 to 18, and preferably 2 to 8 carbon atoms. Cycloaliphatic diols can be employed in their cis or trans configuration or as mixtures of both forms.

Where the polyester components are modified by one or more acid components other than TA, suitable acid components of the linear polyesters may be selected from the class of isophthalic acid; 1,4-cyclohexanedicarboxylic acid; 1,3-cyclohexanedicarboxylic acid; succinic acid; glutaric acid; adipic acid; sebacic acid; 1,12-dodecanedioic acid; 2,6-naphthalenedicarboxylic acid; 2,7-naphthalenedicarboxylic acid, t-stilbene dicarboxylic acid, 4,4'-bibenzoic acid, or mixtures of these or their anhydride equivalents, and the like. Typical PET based polymer for the beverage container industry has about 97 mole percent PET and 3 mole percent isophthalate—thus it is the copolymer polyethylene terephthalate/isophthalate.

In the polymer preparation, it is often preferred to use a functional acid derivative thereof such as dimethyl, diethyl or dipropyl ester of a dicarboxylic acid. The anhydrides or acid halides of these acids may also be employed where practical. These acid modifiers generally retard the crystallization rate compare to terephthalic acid.

Conventional production of polyethylene terephthalate (PET) is well known in the art and comprises reacting terephthalic acid (TA) (or dimethyl terephthalate—DMT) with ethylene glycol (EG) at a temperature of approximately 200 to 250° C. forming monomer and water (monomer and methanol, when using DMT). Because the reaction is reversible, the water (or methanol) is continuously removed, thereby driving the reaction to the production of monomer. The monomer comprises primarily BHET (bishydroxyethylene terephthalate), some MHET (monohydroxyethylene terephthalate), and other oligomeric products and perhaps small amounts of unreacted raw materials. Subsequently, the BHET and MHET undergo a polycondensation reaction to form the polymer. During the reaction of the TA and EG it is not necessary to have a catalyst present. During the reaction of DMT and EG employing an ester interchange catalyst is required. Suitable ester interchange catalysts include compounds containing cobalt (Co), zinc (Zn), manganese (Mn), and magnesium (Mg), to name a few. Generally, during the polycondensation reaction the catalyst preferred is antimony in the form of an antimony salt or compound. Polymerization and polymerizing mean, with respect to the present invention, the steps of forming the monomer and the subsequent polycondensation.

The parts per million (ppm) calculation of the range of useful amounts of zinc and cobalt compounds are based on the actual amount of zinc or the actual amount of cobalt in a compound. As stated earlier, both Zn and Co are ester interchange catalyst that are useful during the production of PET from DMT and EG, as well as being catalyst for the oxygen scavenging compound as it copolymerizes with the PET based polymer.

Suitable zinc compounds are zinc acetate, zinc oxides, zinc borate, zinc carbonate, zinc chloride, zinc dioxide, zinc hydroxide, zinc lactate, zinc malate, zinc stearate, zinc nitrate, zinc oleate, zinc phosphate, zinc sulfate, zinc (ethylene glycolate) and zinc zirconium silicate, to name but a few. The amount of Zn employed in the present invention is from about 15 to 150 ppm based on the PET polymer (not the copolymer).

Suitable cobalt compounds for use with the present invention include cobalt acetate, cobalt carbonate, cobalt chloride, cobalt hydroxide, cobalt naphthalate, cobalt oleate, cobalt linoleate, cobalt stearate, cobalt nitrate, cobalt phosphate, cobalt sulfate, and cobalt (ethylene glycolate), among others. The amount of Co employed in the present invention—from about 10 to 120 ppm Co based on the PET polymer (not the copolymer), is also sufficient to balance any yellowness that may be present in the PET based polymer.

As is known in the art, regardless of whether one starts with DMT and EG, or with TA and EG, monomer in the form of BHET and perhaps some MHET is produced. The monomer then undergoes polycondensation to yield the polymer. It is known in the prior art to use both Co and Zn as ester interchange catalyst. What is not known in the art is the synergistic effect of these catalysts on an oxygen scavenging compound in polyester.

Typical oxygen scavenging compounds are polymer molecules containing allylic positions such as polybutadiene based polymers or polyethylene/cyclohexene copolymers, or containing benzylic positions such as m-xylylamine-based polyamides, or mixtures of these. For the present invention, the amount of oxygen scavenging compound is present from about 1 to about 10% by weight, based on the weight of the copolymer. Use of oxygen scavenging compounds by themselves result in a very slow oxidative process. In fact, this process is so slow that it is not useful for the food packaging industry. The incorporation of oxidation catalyst into the scavenging polymer solves this kinetic problem. With respect to the oxygen scavenging compounds mentioned earlier, the prior art discloses that transition metal catalysts serve this purpose. However, the present invention finds that certain transition metal catalysts inhibit the catalytic effect of the oxygen scavenging compound, while others have a synergistic effect.

The PET based polymer, oxygen scavenging material, and the catalysts can be produced by several different processes, namely during the polymerization of the PET based polymer thereby forming a copolymer, or by combining the components in an extruder having a heated mixing zone and copolymerizing. The copolymerization in either process produces block or random copolymer materials. Then these copolymers are extruded and cut into pellet shapes and sold to producers of packaging containers.

When such copolymers are produced during the polymerization of the PET based polymer, the catalysts may be added at any time during the polymerization, while the oxygen scavenging compound is preferably added near the end of the polycondensation reaction. For example, such copolymers can be produced by introducing Zn and/or Co during monomer formation. Then near the end of the polycondensation reaction, the oxygen scavenging material may be added to the melt (along with more catalyst and/or other additives (mentioned below), if needed).

When such copolymers are produced in an extruder having a heated mixing zone, the PET based polymer, oxygen scavenging compound, and catalyst are introduced into the zone and copolymerized to produce the copolymer.

Other additives may optionally be incorporated within the copolymer such as reheat agents like carbon black, graphite, or dark pigments; fillers; chain branching agents; crystallization retarding agents; and the like, all of which are known in the industry. These additives can preferably be incorporated into the molten polymer, or can be incorporated with the raw materials, or anytime known in the industry.

Experimental Procedure

Intrinsic viscosity (IV) is determined by mixing 0.2 grams of an amorphous polymer composition with 20 milliliters of dichloroacetic acid at a temperature of 25° C. using a Ubbelhode viscometer to determine the relative viscosity (RV). RV is converted to IV using the equation: $IV=[(RV-1)\times 0.691]+0.063$.

Barrier Film Preparation

The polymer pellets were dried in a vacuum at 120° C. for twenty-four hours prior to processing. The dried pellets were then placed in the 15 by 15 centimeter cavity of a 150 millimeter thick metal spacer and sandwiched between 20 by 20 centimeters steel platens covered with Teflon coated aluminum foil. The platens were placed in a press and heated to 270° C. for 5 minutes with no pressure. Pressure was then applied and released; this cycle was repeated three times to ensure that the platens would be free of air bubbles. Finally, the platens were held under 300 pounds per square inch pressure for 5 minutes and quenched in cold water. The resultant barrier test films measured 0.16–0.24 millimeters in diameter.

Oxygen Scavenging Testing

Oxygen flux, J(t), at zero percent relative humidity, at one atmosphere pressure, and at 25° C. was measured with a Mocon Ox-Tran model 2/20. A mixture of 98% nitrogen with 2% hydrogen was used as the carrier gas, and 100% oxygen was used as the test gas. Prior to testing, specimens were conditioned in nitrogen inside the unit for a minimum of twenty-four hours to remove traces of atmospheric oxygen. The conditioning was continued until a steady base line was obtained where the oxygen flux changed by less than one percent for a thirty-minute cycle. Subsequently, oxygen was introduced to the test cell. A reduction in the amount of oxygen was measured from 0 to at least 350 hours. Treatment of the data generated an Apparent Permeation Coefficient (APC), as a function of time online with oxygen exposure $(cc(STP).cm)/(m^2.atm.day)$. The generated APC data is not a steady state value in normal permeation coefficients. APC is data generated that describes oxygen permeation at a fixed point in time, even though this coefficient is changing slowly with time. These changes are too small to be detected during the time necessary for measuring their value at any fixed point in time. Calculation of the APC was done according to a literature method for permeation coefficients for PET copolymers, from a solution Fick's second law of diffusion with appropriate boundary conditions. The literature documents are: Sekelik et al., *Journal of Polymer Science Part B: Polymer Physics*, 1999, Volume 37, Pages 847–857. The second literature document is Qureshi et al., *Journal of Polymer Science Part B: Polymer Physics*, 2000, Volume 38, Pages 1679–1686. The third literature document is Polyakova, et al., *Journal of Polymer Science Part B: Polymer Physics*, 2001, Volume 39, Pages 1889–1899. As a measure of the catalytic effect of these metal compounds on oxygen scavenging, the reduction (in percent) in APC after 350 hours was recorded as the oxygen scavenging enhancement (OSE) value. The OSE values for all Examples are set forth in the Table, and the APC vs. time of Examples 3, 5, 8, 9 and 10 are plotted in the Figure.

Catalyst Metal Quantification

The metal catalyst content of the ground polymer samples was measured with an Atom Scan 16 ICP Emission Spectrograph. The sample was dissolved by heating in ethanolamine, and on cooling, distilled water was added to crystallize out the terephthalic acid. The solution was centrifuged, and the supernatant liquid analyzed. Comparison of atomic emissions from the samples under analysis with those of solutions of known metal ion concentrations was used to determine the experimental values of catalyst metals retained in the polymer samples.

EXAMPLE 1

The BHET was prepared by the reaction of ethylene oxide with TA, followed by crystallization. BHET (1016.8 g) and EG (334.0 g) charged to a 2 liter 316-ss stirred autoclave along with 224 g of a manganese acetate/EG/polyphosphoric acid (PPA) solution (described below), 0.257 g of cobalt acetate, and 0.292 g of antimony oxide. The autoclave heating mantle was set at 280° C., and vacuum was slowly applied over 1 hour with agitation. A reactor pressure of approximately 0.25 Torr was achieved after 1 hour, and the polymerization continued (with vacuum distillation of excess ethylene glycol). After two hours, 10.54 (1.0 wt. %) of hydroxy-terminated polybutadiene (Atofina—Poly BD R45 HTLO resin) was added, vacuum was reapplied, and polymerization was continued for an additional 30 minutes. A white polymer, measuring 0.60 IV was obtained by extrusion under nitrogen pressure into room temperature water. The amount of catalyst was measured and recorded in ppm metal per total polymer weight, as well as micromoles per gram (herein after μmol/g). The APC was recorded as a function of time. The OSE value is set forth in the Table. Analysis of this polymer found 32 ppm retained Mn and 82 ppm retained Co.

The Mn/EG/PPA solution was prepared as followed: EG 558 g (grams) and MnOAc 0.282 g (113 ppm Mn) were charged to a 2L 316-ss autoclave under nitrogen. The heater set point was set to 200° C., and the mixture was heated under agitation. After 65 min. the nitrogen blanket was replaced with a reflux condenser, the set point was increased to 205° C. After an additional 70 mins, 42 ml of a PPA/EG solution containing 1.72 g (114 ppm P) was added, and the heating mantle was set for 240° C. 180 minutes later, after distillation of 214 ml of EG, the heater and condenser were turned off, and the solution was allowed to flow from the autoclave into a glass container, where it was allowed to cool. The slightly red/yellow solution was filtered through Whatman #4 filter paper, removing a small amount of white precipitate. The filtrate solution was stored under nitrogen in a closed container prior to use.

EXAMPLE 2

In the manner of Example 1, 1016.8 g of BHET, 322 g of EG, 236 g of a manganese acetate/cobalt acetate/ethylene glycol/PPA solution, and 0.292 g of antimony oxide were combined and reacted, then 10.54 g of hydroxy-terminated polybutadiene (HPBD) was added, to produce a polymer measuring 0.57 IV. The APC was recorded as a function of time. The OSE value is set forth in the Table.

EXAMPLE 3

In the manner above, 1016 g of BHET was combined with 0.257 g of cobalt acetate and 0.292 g of antimony oxide. Then 10.39 g of hydroxy-terminated polybutadiene (HPBD) was added 30 minutes prior to extrusion of the polymer. After polymerization, the polymer had a 0.60 IV. The APC was recorded as a function of time and graphed in the Figure. The OSE value is set forth in the Table.

EXAMPLES 4–10

In the manner of Example 3, 1016 g of BHET was combined with 0.292 g of antimony oxide, and desired combinations of cobalt acetate, manganese acetate, magnesium acetate, zinc acetate and PPA. In each case, 10.54 g of HPBD was added 30 minutes prior to extrusion. IV values of 0.57–0.63 were obtained. Residual metal levels were quantified using a standard ICP method. The OSE values for each Example are set forth in the Table, and the APC vs. time of Examples 3, 5, 8, 9, and 10 are graphed in the Figure.

THE TABLE

| | Mn | | Zn | | Mg | | Co | | OSE |
|---|---|---|---|---|---|---|---|---|---|
| Example | ppm | μmol/g | ppm | μmol/g | ppm | μmol/g | ppm | μmol/g | percent |
| 1 | 32 | 0.6 | | | | | 82 | 1.4 | 29% |
| 2 | 113 | 2.1 | | | | | 40 | 0.7 | 19% |
| 3 | | | | | | | 69 | 1.2 | 42% |
| 4 | 57 | 1.0 | | | | | 77 | 1.3 | 39% |
| 5 | | | 94 | 1.4 | | | 76 | 1.3 | 69% |
| 6 | 113 | 2.1 | | | | | 0 | | 26% |
| 7 | | | | | 79 | 3.3 | 60 | 1.0 | 23% |
| 8 | | | | | 79 | 3.3 | 60 | 1.0 | 10% |
| 9 | | | 80 | 1.2 | | | 0 | | 57% |
| 10 | 80 | 1.5 | | | | | 60 | 1.0 | 9% |

Example 3, with only Co as the catalyst has an OSE value of 42%. Example 9, with only Zn as the catalyst has a higher OSE value of 57%. Example 5 having both Zn and Co as the catalyst has an OSE value of 69%. Examples 8 and 10 having Mg/Co and Mn/Co, respectively had the least amount of oxygen scavenging activity. Both Mg and Mn inhibit or deactivate the catalytic activity when used with Co (compare Examples 8 and 10 with Example 3). Increased catalytic activity can be obtained by employing Zn with Co, which has the added benefits of balancing the color of the PET polymer should it be needed, as well as keeping acetaldehyde under control for bottle resin. Prior art failed to recognize the huge differences in catalytic effect within the transition metal catalysts. Prior art also failed to appreciate the synergistic combination of Zn and Co.

Thus, it is apparent that there has been provided, in accordance with the invention, an improved oxygen scavenging PET, a process for preparing a PET based oxygen scavenging copolymer, and an oxygen barrier container, all of which fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. An improved oxygen scavenging PET based copolymer comprising: a copolymer of a PET based polymer and an oxygen scavenging compound, said compound comprising from about 1% to about 10% by weight of said copolymer; from about 10 to about 120 ppm Co based on said PET polymer; and from about 15 to about 150 ppm Zn based on said polymer; wherein said Co and said Zn are catalysts for said oxygen scavenging compound.

2. The improved copolymer of claim 1, wherein said PET based polymer comprises at least 60% by weight polyethylene terephthalate units and up to 40% by weight other polymers.

3. The improved copolymer of claim 2, wherein said PET based polymer is a copolymer of polyethylene terephthalate/isophthalate.

4. The improved copolymer of claim 1, wherein said Zn is present in an amount of from about 70 to about 100 ppm, and said Co is present in an amount from about 30 to about 60 ppm.

5. The improved copolymer of claim 1, wherein said oxygen scavenging compound is selected from the class of polymers containing allylic or benzylic positions.

6. The improved copolymer of claim 5, wherein said oxygen scavenging polymers containing allylic positions are polybutadiene polymers or ethylene-pendant cyclohexene copolymers.

7. A process for polymerizing a PET based oxygen scavenging copolymer, comprising the steps of:
   a) polymerizing a PET based polymer;
   b) adding Zn, Co, and an oxygen scavenging compound during said polymerizing step in respective amounts of from about 15 to about 150 ppm Zn based on said PET based polymer, from about 10 to about 120 ppm Co based on said PET based polymer and from about 1% to about 10% of said oxygen scavenging compound by weight of said copolymer;
   c) copolymerizing said oxygen scavenging compound with said PET based polymer to form a copolymer; and
   d) extruding said copolymer.

8. The process of claim 7, wherein said PET based polymer comprises at least 60% by weight polyethylene terephthalate units and up to 40% by weight other polymers.

9. The process of claim 8, wherein said PET based polymer is a copolymer of polyethylene terephthalate/isophthalate.

10. The process of claim 7, wherein said Zn is added in an amount of from about 70 to about 100 ppm based on said PET based polymer.

11. The process of claim 7, wherein said Co is added in an amount of from about 30 to about 60 ppm, based on said PET based polymer.

12. The process of claim 7, including a step of adding an additive selected from the class of reheat agents, fillers, chain branching agents, and crystallization retarding agents.

13. The process of claim 12, wherein said oxygen scavenging compound is selected from the class of polymers containing allylic or benzylic positions.

14. The process of claim 13, wherein said oxygen scavenging compound containing allylic positions are polybutadiene polymers or ethylene-pendant cyclohexene copolymers.

15. A process for preparing a PET based oxygen scavenging copolymer, comprising the steps of:
   a) providing an extruder having a heated mixing zone;
   b) feeding a PET based polymer, containing one or both Co and Zn to said extruder;
   c) feeding to said extruder, materials selected from the class consisting of:
      i) an oxygen scavenging compound and Zn, if Zn is not in said PET;
      ii) an oxygen scavenging compound and Co, if Co is not in said PET; and
      iii) an oxygen scavenging compound if said PET contains both Co and Zn;
   d) copolymerizing in said extruder said oxygen scavenging compound with said PET based polymer to form a copolymer; and
   e) extruding said copolymer, said copolymer comprising from about 15 to about 150 ppm Zn based on said PET based polymer, from about 10 to about 120 ppm Co, and from about 1% to about 10% oxygen scavenging compound by weight of said copolymer.

16. The process of claim 15, wherein said Zn is present in a range of from about 70 to about 100 ppm based on said PET based polymer.

17. The process of claim 15, wherein said PET based polymer comprises at least 60% by weight polyethylene terephthalate units and up to 40% by weight other polymers.

18. The process of claim 15, wherein said oxygen scavenging compound is selected from the class of polymers containing allylic or benzylic positions.

19. The process of claim 18, wherein said oxygen scavenging compound containing allylic positions are polybutadiene polymers or ethylene-pendant cyclohexene copolymers.

20. The process of claim 15, wherein said Co is present in a range of from about 30 to about 60 ppm based on said PET based polymer.

21. The process of claim 15, additionally comprising the step of: adding additives to said extruder, selected from the class of reheat agents such as carbon black, graphite, or dark pigments; fillers; chain branching agents; and crystallization retarding agents.

22. A process for preparing a PET based oxygen scavenging copolymer, comprising the steps of:
   a) providing an extruder having a heated mixing zone;
   b) feeding to said extruder a PET based polymer, an oxygen scavenging compound in an amount of from about 1% to about 10% by weight of said copolymer, Co catalyst in an amount of from about 10 ppm to about 120 ppm based on said polymer, and Zn catalyst in an amount of from about 15 ppm to about 150 ppm based on said polymer; and
   c) copolymerizing said PET based polymer and said oxygen scavenging compound to form a copolymer; and
   d) extruding said copolymer.

23. The process of claim 22, wherein said Zn is present in a range of from about 70 to about 100 ppm based on said PET based polymer.

24. The process of claim 22, including adding to said extruder an additive selected from the class of reheat agents, fillers, chain branching agents and crystallization retarding agents.

25. The process of claim 22, wherein said PET based polymer comprises at least 60% by weight polyethylene terephthalate units and up to 40% by weight other polymers.

26. The process of claim 22, wherein said oxygen scavenging compound is selected from the class of polymers containing allylic or benzylic positions.

27. The process of claim 26, wherein said oxygen scavenging compound containing allylic positions are polybutadiene polymers or ethylene-pendant cyclohexene copolymers.

28. The process of claim 22, wherein said Co is present in a range of from about 30 to about 60 ppm based on said PET based polymer.

29. An oxygen barrier container, comprising: a container having one or more layers of a copolymer of a PET based polymer and an oxygen scavenging compound, said oxygen scavenging compound comprising from about 1% to about 10% by weight of said copolymer, said copolymer having from about 10 to about 120 ppm Co based on said PET based polymer and from about 15 to about 150 ppm Zn based on said PET based polymer; wherein said Co and said Zn are catalysts for said oxygen scavenging compound.

30. An oxygen barrier container of claim 29, wherein said PET polymer comprises at least 60% by weight polyethylene terephthalate units and up to 40% by weight other polymers.

31. The oxygen barrier container of claim 30, wherein said PET based polymer is a copolymer of polyethylene terephthalate/isophthalate.

32. The oxygen barrier container of claim 29, wherein said Zn is present in an amount of from about 70 to about 100 ppm, and said Co is present in an amount from about 30 to 60 ppm.

33. The oxygen barrier container of claim 29, wherein said copolymer comprises an additive selected from the class of reheat agents, fillers, chain branching agents and crystallization retarding agents.

34. The oxygen barrier container of claim 33, wherein said oxygen scavenging compound is selected from the class of polymers containing allylic or benzylic positions.

35. An oxygen barrier container of claim 34, wherein said oxygen scavenging compound containing allylic positions are polybutadiene polymers or ethylene-pendant cyclohexene copolymers.

* * * * *